Sept. 6, 1966 G. J. OVERTVELD 3,271,595

SWITCHING CIRCUIT

Filed May 14, 1963

3 Sheets-Sheet 1

Gilles Jozias Overtveld

By: Diggins, O'Boyle & Harmon

ATTORNEYS

Gilles Jozias Overtveld
By: Diggins, O'Boyle & Harmon
ATTORNEYS

Sept. 6, 1966

G. J. OVERTVELD 3,271,595

SWITCHING CIRCUIT

Filed May 14, 1963

3 Sheets-Sheet 3

Gilles Jozias Overtveld.
By: Diggins, O'Boyle & Harmon
ATTORNEYS 3,271,595
Patented Sept. 6, 1966

3,271,595
SWITCHING CIRCUIT

Gilles J. Overtveld, Ottawa, Ontario, Canada, assignor to Northern Electric Company Limited, Montreal, Quebec, Canada Filed May 14, 1963, Ser. No. 280,403
5 Claims. (Cl. 307—88.5)

Figure 1:
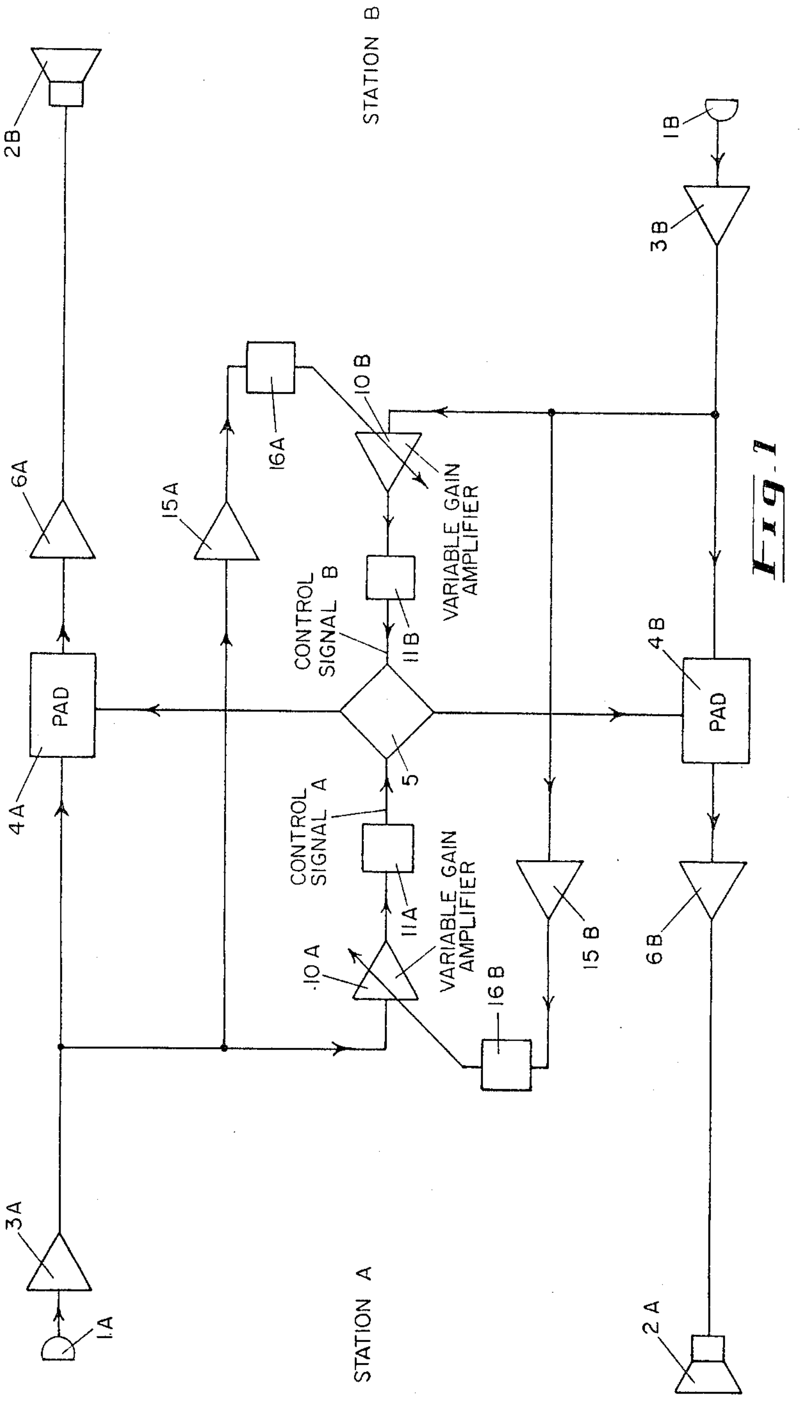

This invention relates to a multi-state circuit which may be stable or unstable in one or more of its states. The invention has further reference to such a circuit which can be switched from one state to another with high sensitivity of switching to an exciting impulse. The circuit of the invention is thus of particular interest where the switch initiating signal is of small amplitude.

The most common multi-state circuit has two states. Bi-stable circuits such as multi-vibrators are well known and various, and while it is not intended that the circuit of the invention should be so restricted, it does find very considerable use in the "hands free" interphone system such as described in my co-pending patent application entitled, "Electrical Control Circuit," executed April 24, 1963, and assigned to the assignee of this invention.

It is an object of the invention to provide a switching circuit which is highly sensitive to triggering signals for switching it from one state to another. It is further object of the invention to provide a bi-stable multi-vibrator circuit which can be switched by small alternating current input signals, such as is required in the "hands free" interphone system mentioned above.

More specifically in accordance with the invention there is provided, in a circuit having a plurality of possible states and comprising at least a pair of current valves (the word "valve" is intended to mean an electrical conducting device through which the current can be controlled, for example and for instance a transistor or a vacuum tube) and means for connecting a current source to said valves, one of said states being established by current conduction through one of said valves and current interruption through the other, each of said valves having a current emitting electrode and a current control electrode, means interconnecting the first of said pair and the control electrode of the second and said pair, current interruption through said first valve, serving to bias said control electrode of the second valve with respect to its emitting electrode to alter said second valve from current interruption to current conduction condition, a non-linear resistive conducting device presenting a high impedance when carrying a small direct current in one direction and a low impedance when carrying a larger direct current in said direction, means connecting said device between the control electrode and the emitting electrode of said second valve, said first valve biassing said device to carry the small direct current when said second valve is in its interruption condition, and to present a high impedance in shunt with said second valve control electrode and its emitting electrode when said second valve is being switched to its conduction condition, and means for connecting a triggering current source in series with said non-linear resistive device for switching said second valve to current interruption condition, said first valve biassing said device to carry the larger direct current when said second valve is in its conduction condition and to present a low impedance in series with said triggering source when said second valve is being switched to its interruption condition.

A description of the invention will now be made explaining firstly, in brief terms, the interphone system in which it may be incorporated.

Figure 2:
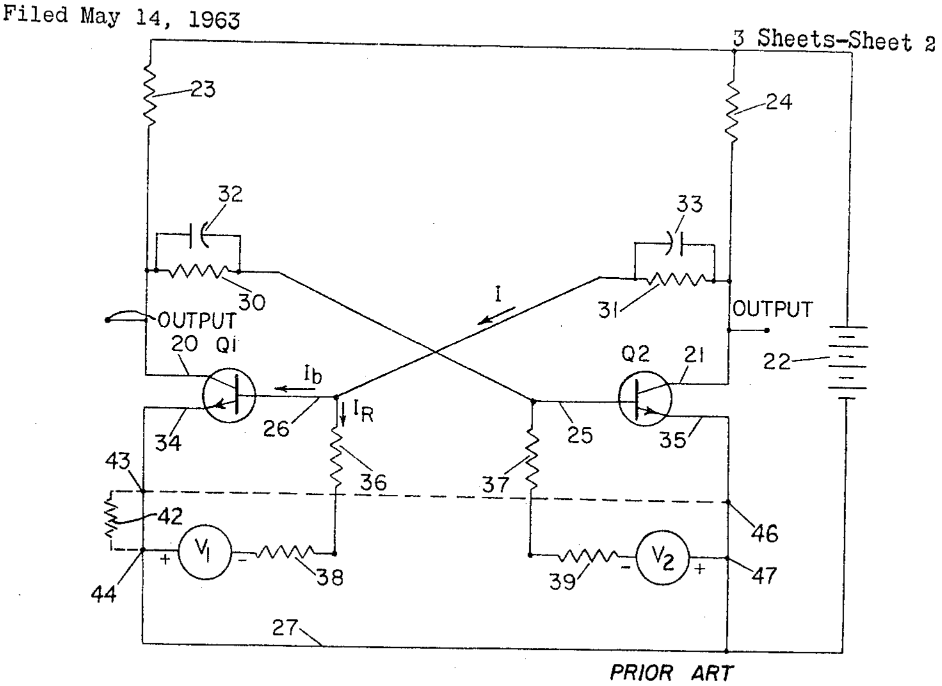
Figure 3:
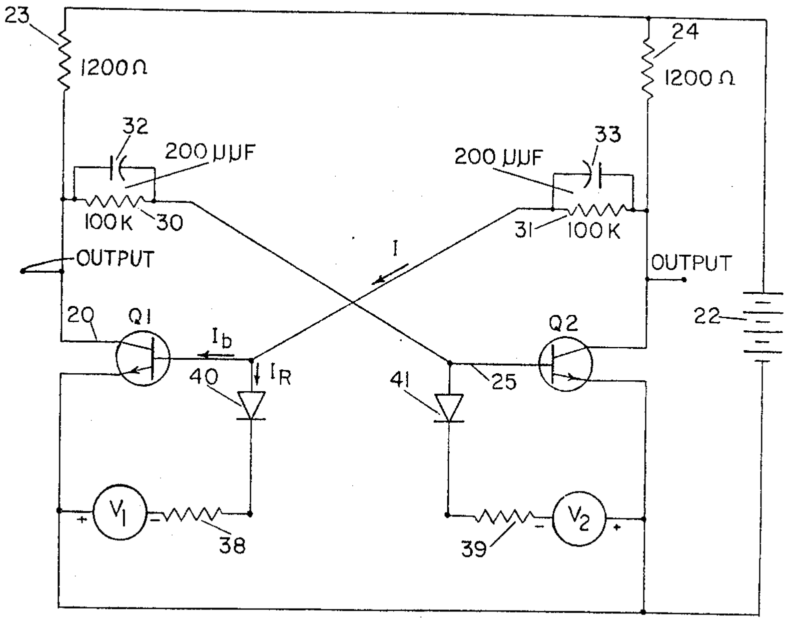
Figure 4:
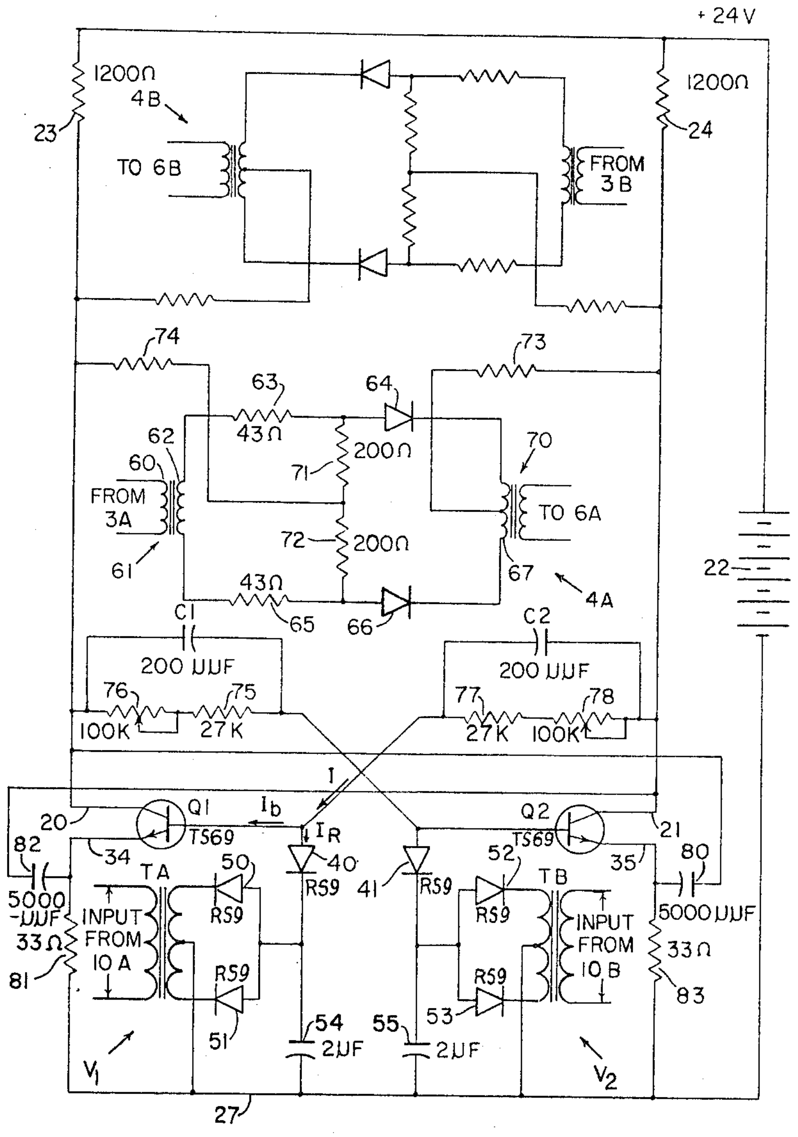

Reference will be made to the accompanying drawings in which;

FIGURE 1 shows a block diagram of an interphone circuit in which the invention may be employed, FIGURE 2 shows a basic multi-vibrator circuit, FIGURE 3 shows its modification in accordance with the teaching of the invention, and FIGURE 4 shows a circuit diagram of the invention indicating the way in which it fits into the circuit of FIGURE 1.

Making reference now to FIGURE 1, there are two stations A and B between which communication is to be established. Each station is provided with a microphone 1 and a loudspeaker 2. Each microphone feeds a preamplifier 3, which leads to an attenuator pad 4, to be switched in or out of circuit by a two state device 5. Each pad 4 then feeds a power amplifier 6 for the loudspeaker 2 of the opposite station. Signals are derived for circuit 5 from variable gain amplifiers 10, fed from preamplifiers 3. The output of each amplifier 10 passes to a rectifier 11 which develops a control signal A and B respectively, which is independent of the frequency content but dependent upon the amplitude of the signals entering the respective microphone 1A or 1B. It is desirable that switching should only take place when one of the input signals exceeds the other by a fixed ratio regardless of the absolute amplitude of the input signals. Each preamplifier 3 therefore also feeds a further amplifier 15 whose output is rectified at 16 to produce a control signal for the respective variable gain amplifiers 10. By suitable choice of gain for amplifiers 15, and the sensitivity of amplifiers 10 to control, the relative levels of the control signals A and B can be made dependent only on the ratio of the inputs to microphones 1. The way in which the controlled amplifiers 10 operate is discussed in the copending patent application mentioned above.

Turning now to FIGURE 2, a conventional bi-stable multi-vibrator circuit is shown employing transistors $Q_1$ and $Q_2$, having collectors 20 and 21, respectively, fed from a current supply 22 of positive potential through load resistors 23 and 24. The collectors 20 and 21 of transistors $Q_1$ and $Q_2$ are cross-coupled to the bases 25 and 26, respectively, through resistors 30 and 31 bridged by capacitors 32 and 33. The bases 26 and 25 of transistors $Q_1$ and $Q_2$ are connected, through resistors 36 and 37 respectively, to triggering sources $V_1$ and $V_2$ having internal resistance 38 and 39 respectively. The sides of sources $V_1$ and $V_2$ opposite to the bases are connected to the negative rail 27 to which emitters 34 and 35 are also joined. Sources $V_1$ and $V_2$ generate a voltage only at the time of triggering. In the circuit shown, transistors $Q_1$ and $Q_2$ were silicon NPN type TS69, but by reversing the polarity of the supply 22, PNP types of similar characteristics could be used equally well.

Let us assume in FIGURE 2 that $Q_1$ is conducting and $Q_2$ is cut-off. A current I will flow through the junction of collector 21 and resistor 24. Part of the current $I_b$ will flow to base 26, and the other $I_R$ will flow through the base resistor 36 and the internal resistance 38 of source $V_1$ to negative rail 27. If now $V_1$ is gradually turned on so that the junction of $V_1$ and 38 is made negative with respect to rail 27, the current $I_R$ increases and $I_b$ decreases. Now initially the decrease in current $I_b$ and the consequent rise in potential of collector 20 is not sufficient to produce an increase in current into base 25 so as to alter the potential of collector 21 appreciably. This is because transistor $Q_2$ is in its cut-off condition and the current gain is negligible. As $V_1$ continues to increase in magnitude and the gain of $Q_2$ increases as conduction through it begins and increases, a point is reached at which the circuit becomes unstable, depending upon the gain from collector 20 to base 25 and that from collector 21 to base 26. A switch then occurs. The capacitors 32 and 33 compensate for the impedance of resistors 30 and 31 of $Q_2$ and $Q_1$, respectively, and lower the switching time. If the gain between $Q_1$ and $Q_2$ is high, the switching point is narrowly defined in terms of the voltage of $V_1$, but if the gain is low, the voltage of collector 20 has to rise considerably before switching takes place. The method by which $V_2$ switches transistor $Q_2$ to cut-off condition is similar.

The circuit of FIGURE 2 has been simplified in that in some instances, as with transistors whose characteristics are not accurately predetermined, a bias source may be required to ensure stability and to provide that the base of the cut-off transistor is negative with respect to its emitter. The simplest way of doing this is by insertion of a resistor 42 as shown in broken lines between points 43 and 44. The direct connection between 43 and 44 would then be broken and wire 45 taken to point 46. The connection between points 46 and 47 would then be broken too. When the transistor characteristics are accurately known, the bias resistor can be excepted because a forward bias between base and emitter of about .6 volt is required for a transistor to be made conductive. The collector voltage of the conducting transistor, however, can be low enough that the D.C. potential on the base of the cut-off transistor is below the .6 volt.

There is a conflict between the requirement of sharp switching and high sensitivity to voltage $V_1$. If the gain is increased by increasing resistance 37 so that there is low shunting of the base/emitter circuit then the resistance in series with source $V_2$ is increased, and a greater change in the voltage of $V_2$ is required before it can accomplish switching. There is therefore an optimum value of resistors 30, 31, 36 and 37 for best sensitivity and sharpest switching. In a typical circuit the sources $V_1$ and $V_2$ would see an input impedance of about 5000Ω and switching potentials of about 1.5 volts would be required.

In carrying out the teaching of the invention, it has been found possible to reduce the switching voltage about fourfold for the same input impedance.

Let us now turn to FIGURE 3 in which similar reference numerals have been used as in FIGURE 2 where identical components occur and in which some typical values have been placed against these components. In the circuit of FIGURE 3 diodes 40 and 41 replace the resistors 36 and 37 of FIGURE 2 respectively.

In considering FIGURE 3, it should be kept in mind that the curve of applied voltage against current for conduction in the forward biased direction of a silicon diode is exponential, the slope of the curve being shallow at low currents and becoming steeper at high currents. This corresponds with a high D.C. resistance at low currents and a low D.C. resistance at higher currents.

Consider the condition for FIGURE 3 where $Q_1$ is conducting and $Q_2$ is essentially cut-off. The current $I_R$ which has a low value flows through the diode 40 producing the forward conducting higher value resistance condition of the diode, but which in actuality constitutes a relative low or small resistance value. The effect of this is to place a relatively small resistance in series with $V_1$ and consequently to require a low switching voltage. If triggering voltage from $V_1$ is now applied, the current $I_R$ is increased, and the resistance of 40 further decreases. Diode 41 is however in the low or essentially non-conducting condition and the resistance in shunt with the base/emitter circuit of transistor $Q_2$ is high and the gain from $Q_1$ to $Q_2$ is high. This gives the requirement for sharp switching. It is thus seen that the diodes 40 and 41 act as a high impedance in shunt with the base/emitter circuit of their respective transistors when that transistor is being switched on, and as a low impedance in series with the switching source when that transistor is to be switched off.

We will now refer to FIGURE 4 which shows the circuits 5, 11A, 11B and 4A and 4B of FIGURE 1.

The transformer TA in the lower left corner of FIGURE 4 receives input from the amplifier 10A of FIGURE 1 and transformer TB is supplied from 10B of FIGURE 1. The two transformers form a full wave rectifier circuit for the input audio frequencies with diodes 50, 51 and 52, 53, respectively. By means of the rectifier circuits, charge is built up on condensers 54 and 55, respectively, in accordance with the level of input to the transformers TA and TB. This charge can be caused to trigger the bistable circuit of transistors $Q_1$ and $Q_2$ into one or other condition depending upon the levels of input to TA and TB. The bi-stable circuit includes the pair of transistors $Q_1$ and $Q_2$ and between the collectors 20 and 21 of which are connected two circuits including the pad networks 4A and 4B. Each of these networks is similar and only 4A will be described. An input winding 60 on a transformer 61 is fed from preamplifier 3A (FIG. 1). Input transformer output winding 62 is joined through series connected resistance 63 and diode 64 and series connected resistance 65 and diode 66 to input winding 67 of an output transformer 70. A pair of resistances 71 and 72 in series is connected between the junction of resistor 63 and diode 64 and the junction of resistor 65 and diode 66. The input winding 67 of transformer 70 is center tapped, and a lead is taken from this tapping through a resistor 73 to a collector 21 of transistor $Q_2$. The tapping between resistors 71 and 72 is taken through a resistor 74 to the collector 20 of transistor $Q_1$. It can be seen now that when transistor $Q_2$ is conducting and $Q_1$ is cut-off the potential of collector 21 will be lower than that of 20, the diodes 64 and 66 will be forward biased, and current will be allowed to flow into the junction of 71 and 72 and out of the tapping on the input winding 67 of transformer 70.

With the values of resistance shown and where the impedances of windings 62 and 67 are 500Ω and 600Ω, respectively, when the diodes 64 and 66 are forward biassed at 1.5 ma. each, the loss inserted by the pad is about 10 db. When the diodes are reverse biassed at approximately 15 volts, that is when transistor $Q_1$ is conducting and $Q_2$ is cut off, the loss is greater than 70 db. The pad 4B is exactly similar to 4A except that 4B is connected inversely and inserts a large loss when 4A is in the low loss condition and vice versa.

The collectors 20 and 21 and emitters 35 and 34 of transistors $Q_1$ and $Q_2$ are cross-coupled through short time constant RC circuits comprising condenser 80, resistor 81, and condenser 82 and resistor 83 respectively. This prevents any tendency to high frequency instability by applying negative feedback at these frequencies.

In the circuit of FIGURE 4, it can be seen that the full wave rectifiers 50, 51 and 52, 53 are connected in series with diodes 40 and 41, respectively. These rectifiers have the same type of voltage/current conduction characteristic in the forward biased direction as diodes 40 and 41 and therefore the resistance connected between the base and emitter of each of the two transistors is dependent upon the potential of the collector of the opposite transistor in the same fashion as described for the circuit of FIGURE 3 using a single diode 40 and 41 in each base/emitter circuit. The resistances 30 and 31 (FIGURE 3) are each replaced respectively by two resistors 75 and 76 and 77, 78 in series. Resistors 76 and 78 are variable and can be used to control the base current of each of the transistors $Q_1$ and $Q_2$ when in their respective conduction condition. By adjusting this base current, the circuit can be made very sensitive to trigger voltage. If the current is too high, so that the conducting transistor is far into saturation, switching requires a fairly large voltage to be developed on condensers 54 or 55, if the current is too small the circuit tends to become unstable. With the values of components shown, the circuit of FIGURE 4, when set up, will switch from one state to the other when the difference in input signals to transformers TA and TB is 5 db.

In FIGURE 4, as with FIGURE 3, no means for reverse biassing the base emitter path of the cut-off transistor has been shown, for the reasons explained for FIG- URE 2. If however it should be thought desirable in any particular case, such biassing may be provided for instance by connecting the lower ends of resistors 81 and 83 together and taking this junction to the negative rail 27 through a suitable value resistor. The resistor may be shunted by a breakdown diode to hold the voltage drop across it at a required value.

Whilst the description of the invention has been concerned with two stable state multi-vibrator circuits, it may also be employed in those which have only one stable state or those unstable in both states. When associated with an unstable state, the trigger source will serve to synchronize the switching form this state. It is also unnecessary for diodes to be employed for both transistors if triggering of only one is anticipated, such as in the single stable or unstable circuits mentioned above, since a series diode will only be required for the single trigger source.

Although the circuits described have used transistors, other current valves, such as vacuum tubes, could replace them provided the voltages supplied to the several electrodes of the tubes are made correct for proper operation as will be apparent to those skilled in the art.

I claim:

1. In a switching circuit which comprises a pair of current valves each valve comprising a current emitter, a current control electrode, and a current collector, said control electrode controlling current flow between said emitter and said collector in dependence upon electrical bias between said emitter and said control electrode, means connecting each said valve for urging current flow between its respective emitter and collector, means interconnecting said valves for alternate switching between a pair of circuit states, the first state comprising current conduction through the first of said valves and current interruption through the second of said valves and the second state comprising current conduction through said second valve and current interruption through said first valve, said circuit being triggerable for switching from the second to the first state by application of current between said control electrode and said emitter of said second valve; said interconnecting means comprising, means connecting the collector of the first valve and the control electrode of the second valve, the collector of said first valve and said interconnected control electrode of said second valve being low in potential with respect to the emitter of said second valve when said circuit is in said first state and being higher when said circuit is in said second state, the improvement which comprises: a non-linear resistive conducting device presenting a higher impedance when carrying a small direct current in one direction and a lower impedance when carrying a larger direct current in said direction, and means connecting said non-linear resistive device in series with a triggering signal source between said control electrode and said emitter of said second valve for passing said small current through said device when said circuit is in said second state in the absence of a triggering signal from said triggering signal source and for passing said larger current when said circuit is in said second state in the presence of a triggering signal, said non-linear resistance device heightening sensitivity of the circuit to triggering by said triggering signal source from its second to its first state.

2. Apparatus as defined in claim 1, said interconnecting means comprising means connecting the collector of said second valve and the control electrode of said first valve, the collector of said second valve and the control electrode of said first valve being low in potential with respect to the emitter of the first valve when said circuit is in said second state and being higher when said circuit is in said first state, said circuit being triggerable for switching from the first to the second state by application of current between said control electrode and emitter of the first valve, a second non-linear resistive conducting device presenting a higher impedance when carrying a small direct current in one direction and a lower impedance when carrying a larger direct current in said direction, means connecting said second non-linear resistive device in series with a second triggering signal source between said control electrode and said emitter of said first valve, thereby passing low direct current through said device when the circuit is in the first state in the absence of a triggering signal from said second triggering signal source and higher direct current when in the first state in the presence of a triggering signal, said non-linear resistance device heightening sensitivity of the circuit to triggering by said second triggering source from its first to its second state.

3. Apparatus as defined in claim 1, wherein said non-linear resistive conducting device comprises a silicon diode.

4. Apparatus as defined in claim 1 wherein said means interconnecting the collector of the first valve and the control electrode of the second valve comprises a variable resistance.

5. Apparatus as defined in claim 4, wherein said triggering signal source comprises, alternating current generating means, means for rectifying said alternating current, and means for passing said rectified alternating current through said non-linear resistive conducting device.

References Cited by the Examiner

UNITED STATES PATENTS

| | | | |
|---|---|---|---|
| 2,478,683 | 8/1949 | Bliss | 328—196 |
| 2,831,986 | 4/1958 | Sumner | 307—88.5 |
| 2,974,238 | 3/1961 | Lohman | 307—88.5 |
| 3,067,336 | 12/1962 | Eachus | 307—88.5 |

ARTHUR GAUSS, *Primary Examiner.*

B. P. DAVIS, *Assistant Examiner.*